United States Patent
Smith et al.

(10) Patent No.: US 8,287,034 B2
(45) Date of Patent: Oct. 16, 2012

(54) MAGNETIC FASTENER CLIP

(75) Inventors: Michael Walter Smith, Lake Zurich, IL (US); Daniel James Dickinson, Libertyville, IL (US)

(73) Assignee: Termax Corporation, Lake Zurich, IL (US)

( * ) Notice: Subject to any disclaimer, the term of this patent is extended or adjusted under 35 U.S.C. 154(b) by 0 days.

(21) Appl. No.: 12/983,010

(22) Filed: Dec. 31, 2010

(65) Prior Publication Data

US 2011/0140474 A1    Jun. 16, 2011

Related U.S. Application Data

(63) Continuation-in-part of application No. 12/464,867, filed on May 13, 2009.

(51) Int. Cl.
*B62D 27/04* (2006.01)
*B62D 27/06* (2006.01)

(52) U.S. Cl. ...... 296/191; 296/1.08; 296/39.1; 296/214; 24/303; 248/206.5; 248/309.4

(58) Field of Classification Search .............. 24/303, 24/114.2, 457; 248/206.5, 209.4, 683, 537, 248/309.4; 296/214, 39.1, 1.08, 193.06, 296/191, 187.01
See application file for complete search history.

(56) References Cited

U.S. PATENT DOCUMENTS 7,306,190 B2 * 12/2007 Tisol, Jr. .............. 248/206.5
* cited by examiner

*Primary Examiner* — Dennis Pedder
(74) *Attorney, Agent, or Firm* — CGIP Law

(57) ABSTRACT

A magnetic fastener clip includes a base and a boss attached to the base. The boss has two or more ratchets. According to one embodiment, one end of the boss is attached to the base and the other end has the two or more ratchets. Alternatively, either or both ends may have the two or more ratchets. A magnetic fastener has a hole with suitable shape and diameter to adjustably fasten with at least one of the ratchets and adjustably fasten the magnetic fastener. An umbrella is positioned between the base and the magnetic fastener. The umbrella is operative to flex or compress appropriately to permit the magnetic fastener to engage at least one of the two or more ratchets. The magnetic fastener clip adapts to different surface curvatures and thicknesses. The magnetic fastener clip is operative for blind attachment into a structure, such as a vehicle chassis i.e. door frame, chassis or roof. The boss may optionally be welded to hold the magnetic fastener against the umbrella. An optional carrier is attached to the base to provide additional height for suitable applications.

21 Claims, 7 Drawing Sheets

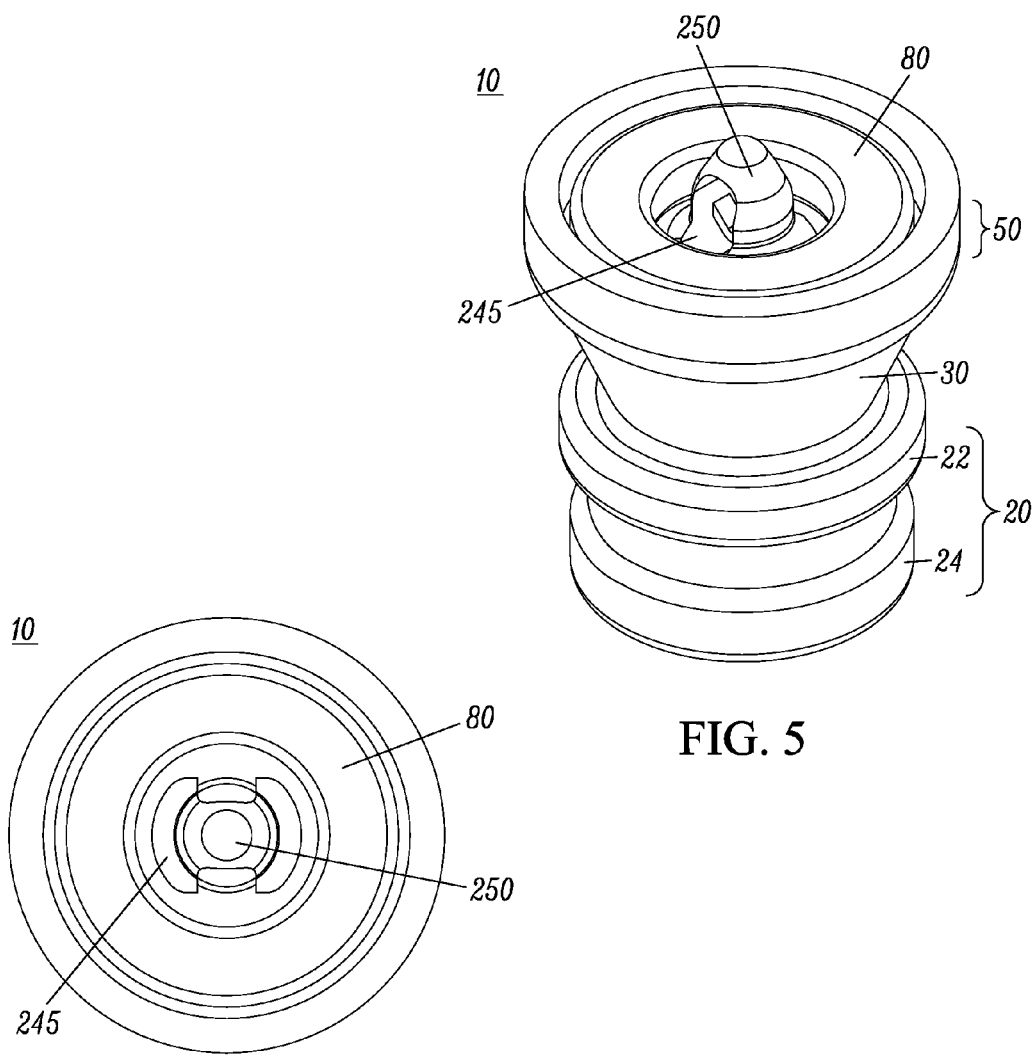
FIG. 5
FIG. 6
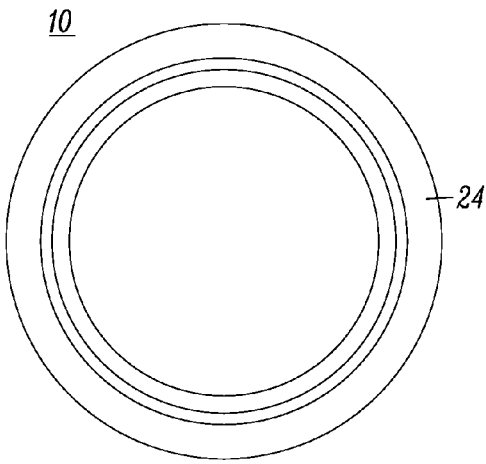
FIG. 7

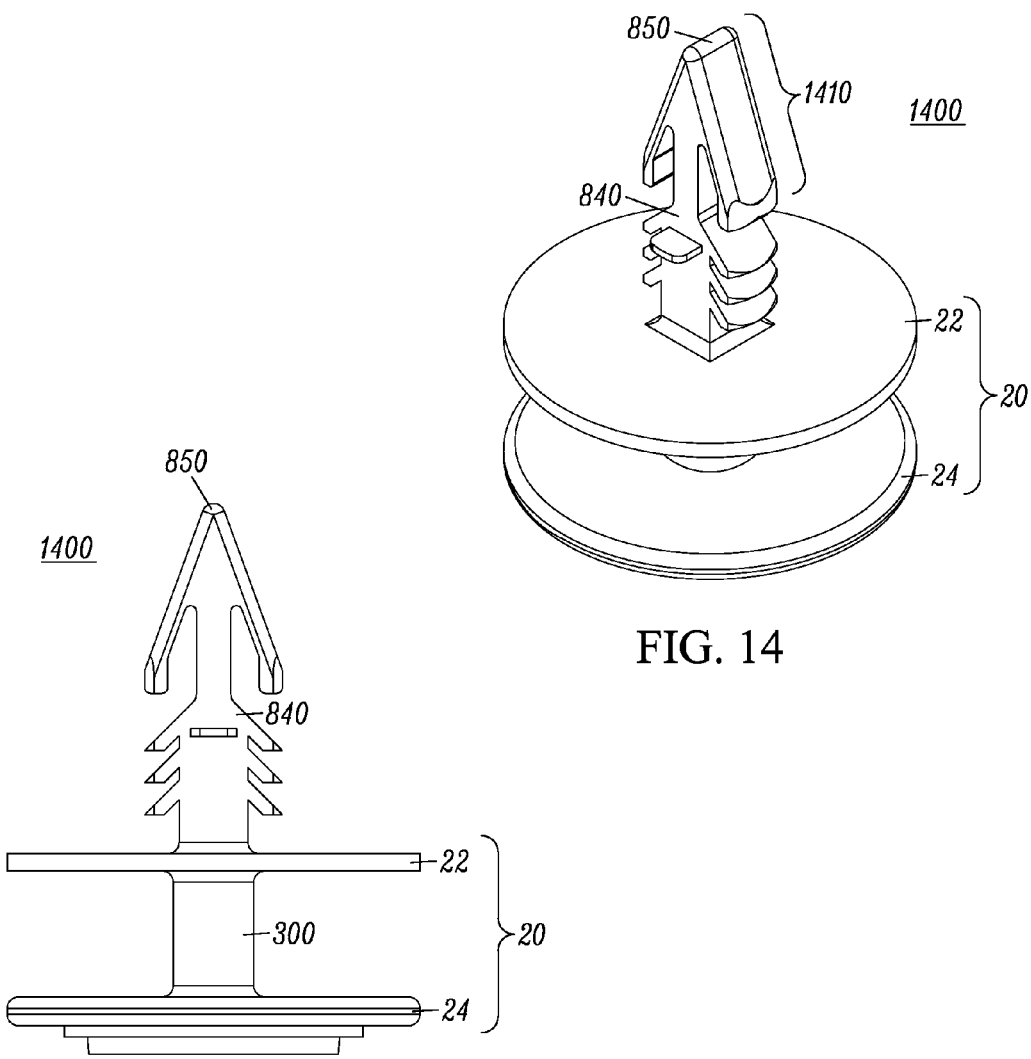
FIG. 14
FIG. 15
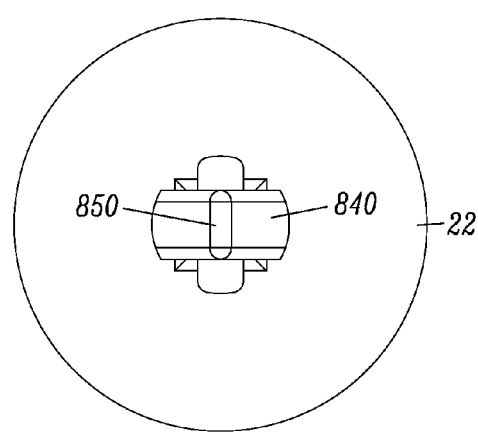
FIG. 16

MAGNETIC FASTENER CLIP

RELATED APPLICATIONS

This is a continuation in part application claiming priority from an application entitled "Magnetic Fastener Clip" having a Ser. No. 12/464,867, and having a filing date of May 13, 2009, the entire disclosure of which is incorporated herein by reference.

FIELD OF THE INVENTION

The invention relates generally to devices for fastening objects, and more particularly to a magnetic fastener clip for insertion into an engagement structure, such as a vehicle chassis, a hollow substrate, a wall, a plate or any suitable surface.

BACKGROUND OF THE INVENTION

A number of devices and fasteners are currently available for fastening panels such as body panels and automobile interior trimpiece panels to the chassis of a vehicle. Fastener clips are used in automobile assemblies to secure body panels such as pillar covers, headliners, interior panels and the like to roofs, door structures and body pillars. As used herein, a body panel refers to, for example, any interior or exterior structure attached to a vehicle, such as a plastic or metal interior trim piece or any interior trimpiece. The body panel may be any suitable exterior body panel, such as a fender, bumper, quarter panel or door panel. The chassis of the vehicle may include any substrate, plate, body panel, structural framework, chassis component or subcomponent, support component, wall or any suitable object or combination.

Interior automobile fasteners, such as screws, are known to retain a body panel to a vehicle chassis. For example, a screw may attach a headliner in position within the automobile roof. However, many of these fasteners only fasten around the periphery of the headliner. While a dome light or the like may be located in the middle of the roof area, extensive expanses of the headliner are not supported or fastened by such structures. Also, these fasteners allow the headliner to sag, providing an aesthetically unacceptable appearance.

An automobile headliner is typically made of cloth, foam, plastic or other suitable material and generally includes a suitable substrate layer. A fastener clip may be secured to the substrate by an adhesive, such as glue, and is then attached to the underlying roof structure.

Attaching the headliner to the interior of the roof typically requires securing clips already fastened to a headliner assembly into a hole, slot or mounting point on the roof. At least some of the clips require blind insertion and installation of the fasteners because the installer is not able to view the fastener clip or the mounting point on the roof.

Fastener clips are also known for attaching body panels to an automobile chassis. Magnets may be used to reduce the problem of the blind fastener application. For example, fastener clips are known that attach to an automobile headliner or the like using adhesive, and which firmly connects to a magnet. Thus, magnetic fastening clips do not require aligning a fastener with a mating hole and attachment of the fastener to the hole.

Another known clip has a base, a dome spaced from the base and a plurality of supports between the base and the dome. A hollow post extends outwardly from the dome and includes at least one deflectable portion having an outward protuberance thereon. A pin is substantially aligned with the post and connected thereto by at least one frangible link. A frangible link between the pin and the clip is adapted to rupture when the pin is driven. However, since the pin requires alignment and insertion during manufacture, assembly is time consuming labor intensive and expensive.

These known clips however are neither sufficiently rugged nor flexible for example on an automobile assembly line that can be somewhat harsh. These fastening clips typically do not have a long useful life to support the headliner and prevent staking throughout the anticipated life expectancy of the vehicle. During installation the headliner can be moved, stretched or twisted inconsistently. Also, these fastening clips have a fixed engagement length between the chassis and body panel. However, the fastener device is typically required to secure the panel to the chassis that may have sheet metal with different amounts of curvature or thicknesses throughout. If the sheet metal varies in curvature or thickness or if for example, tolerances in production of the vehicle chassis or in the trim-piece, i.e. headliner exist, then engagement of one fastener to the roof may not provide suitable magnetic engagement or will otherwise result in movement. Further, less than all these fasteners typically make engagement with the chassis. Twisting of the body panel will be likely more prevalent because less than all contact points are actually made with the roof. As a result, sagging, wear, squeaks, rattles, buzzing, corrosion and loss of elasticity and loss of sealing may result, especially after years of vehicle operation and exposure to vibration and other environmental conditions. As such, these fastener clips do not provide sufficient flexibility.

Once installed, during use of the automobile, the headliner is sometimes contacted or pushed by passengers. The fastener device is typically required to secure the headliner under a variety of environmental conditions, such as in the presence of vibration at various levels of amplitude and frequency. Further, the fastener device should prevent or minimize the amount of buzzing, rattling or any other type of noise that may cause attention to the occupants of the vehicle or otherwise weaken the attachment. Further yet, another requirement of the fastener device is that the fastener device accommodates various levels of sheet metal curvature, thicknesses, and production tolerances, such as various dimensions amongst, for example, the body panels as well as the vehicle chassis. Conventional fastener devices typically do not adequately fasten to a range of sheet metal thicknesses and do not minimize or eliminate buzzing and rattling and do not sufficiently accommodate variations in production tolerances. As a result, these clips do not properly fasten the body panel to the chassis, break or otherwise fail under these conditions. If the fastener clip is broken after installation of the body panel, sagging can occur again presenting the aesthetically undesirable appearance. Further, replacement of an installed, broken clip can be difficult.

BRIEF DESCRIPTION OF THE DRAWINGS

FIG. 5 is a perspective view of the magnetic fastener clip according to one embodiment;

FIG. 6 is a top view of the magnetic fastener clip according to one embodiment;

FIG. 7 is a bottom view of the magnetic fastener clip according to one embodiment;

FIG. 14 is a perspective view of a portion of the fastener clip according to an embodiment;

FIG. 15 is a side view of a portion of the fastener clip according to the embodiment; and FIG. 16 is a top view of the portion of the fastener clip according to the alternative embodiment.

DETAILED DESCRIPTION OF THE PREFERRED EMBODIMENTS

Figure 1:
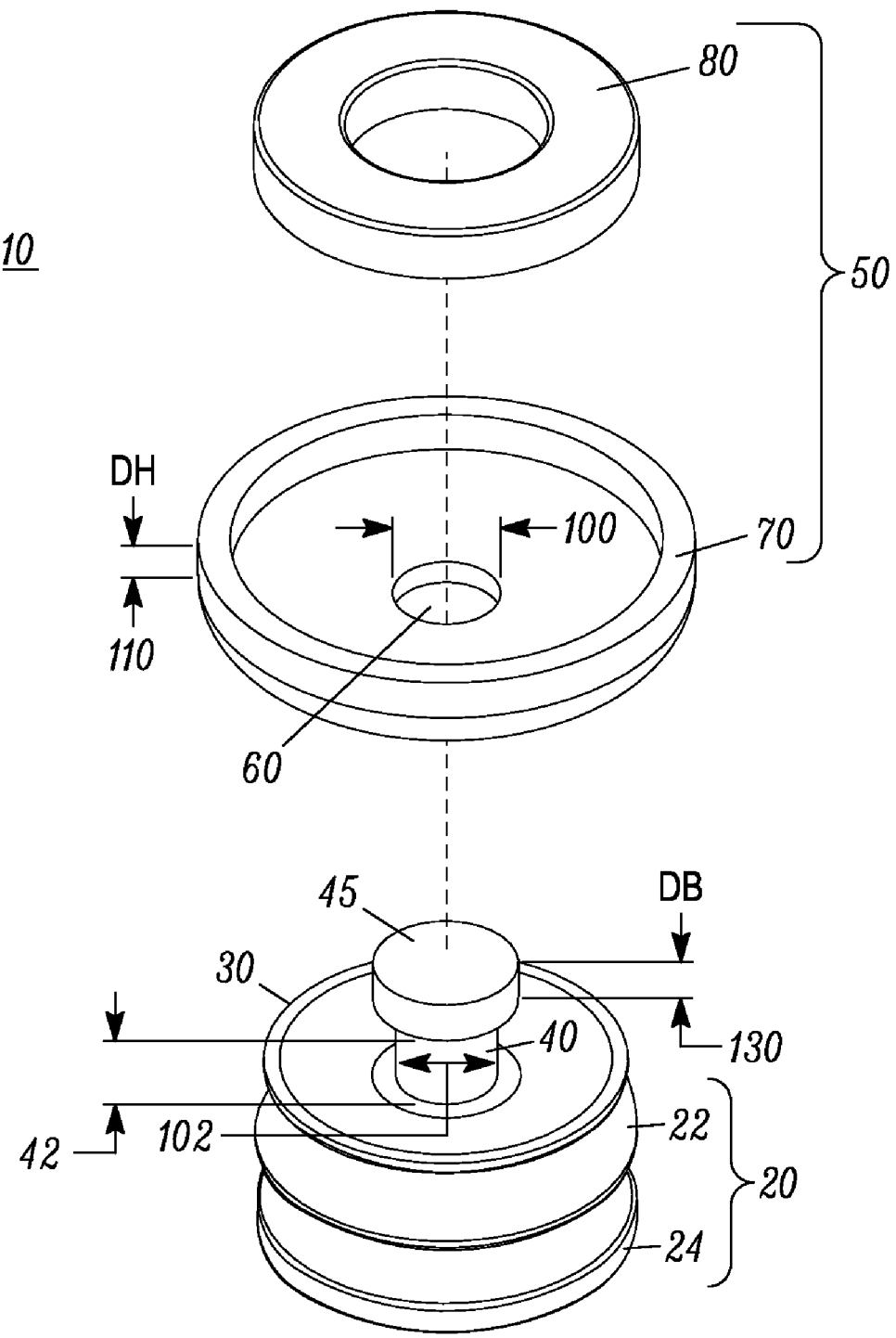
FIG. 1 is an exploded view of a magnetic fastener clip according to one embodiment.

A magnetic fastener clip includes a base and a boss attached to the base. The boss has two or more ratchets. According to one embodiment, one end of the boss is attached to the base and the other end has the two or more ratchets. Alternatively, either or both ends may have the two or more ratchets. A magnetic fastener has a hole with suitable shape and diameter to adjustably fasten with at least one of the ratchets and adjustably fasten the magnetic fastener. An umbrella is positioned between the base and the magnetic fastener. The umbrella is operative to flex or compress appropriately to permit the magnetic fastener to engage at least one of the two or more ratchets. The magnetic fastener clip adapts to different surface curvatures and thicknesses. The magnetic fastener clip is operative for blind attachment into a structure, such as a vehicle chassis i.e. door frame, chassis or roof. The boss may optionally be welded to hold the magnetic fastener against the umbrella. An optional carrier is attached to the base to provide additional height for suitable applications.

Among other advantages, the magnetic fastener clip relatively easily facilitates attachment of a body panel with the structure, such as the vehicle door frame, chassis, instrument panel structure, pillar or roof, such that a single adjustable magnetic fastener clip may be used with different depth attachment requirements, sheet metal curvatures and/or thicknesses. For example, a vehicle door, pillar, instrument panel structure, chassis, or roof may have different sheet metal curvatures and thicknesses at various parts of the vehicle. Since the fastener clip adapts automatically to different attachment requirements, depths, sheet metal curvatures and thicknesses, the same fastener clip may be used throughout the vehicle thus eliminating the need for specific fastener clips for specific roof curvatures and thicknesses. The body panel may be an automobile headliner, door panel, instrument panel, A, B, C, D, etc. pillar panel, bumper, fender, quarter panel, grill, hood, roof, trunk panel or any suitable interior or exterior panel.

The magnetic fastener has a hole with a diameter to receive at least one of the two or more ratchets on the boss, and adjustably fasten the magnetic fastener such that the umbrella is operative to flex to permit the magnetic fastener to engage at least one of the two or more ratchets. According to one embodiment, the boss is attached to the magnetic fastener at one of two or more ratchet positions corresponding to one or more ratchet positions. The umbrella is operative to flex or compress according to the ratchet setting corresponding to the required depth or length and to an appropriate curvature. As the umbrella flexes, the magnetic fastener may pivot about the boss for example at an angle to allow the magnetic fastener to adapt to different surface curvatures while securely fastened to the body panel. According to one embodiment, the magnet does not engage the boss. Thus, the umbrella support structure adapts to different attachment lengths, variations of sheet metal roundness and thicknesses thus allowing the magnet fastener to adjust to different depths while pivoting and maintaining a high level of extraction force. During installation the engagement magnet continuously adapts to variations in curvature and dimensions of the vehicle roof and/or in the body or headliner panel. Thus, only a single magnetic fastener clip need be used with a vehicle or application even if different attachment lengths are required at different attachment points or even if the curvature or thickness of the sheet metal varies substantially. According to another embodiment, the boss is welded to the magnetic fastener to securely fasten the headliner to the roof and provide long reliable life.

The magnet, along with an optional carrier, permits relatively easy insertion of the magnetic fastener clip into a vehicle chassis, pillar, instrument panel structure, door, roof or suitable body panel while providing a relatively high level of extraction force from the body panel. Assembly of the body panel onto the vehicle chassis is very easy and requires no or a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for blindly inserting the body panel into the vehicle chassis may result in fewer injuries to the assembly workers, including injuries related to repetitive stress syndrome. Further by selecting a single fastener or reducing the number of different fasteners for different sheet metal curvatures and thicknesses, confusion during assembly is eliminated since the same type or a reduced number of fasteners may be used for all or most body panel fasteners. Thus, an assembly worker need not worry about selecting the wrong fastener.

The relatively high level of extraction force, characteristic of the magnetic fastener clip, securely attaches the body panel, such as a door panel, or headliner, to the vehicle chassis. Further, the fastener clip continuously adapts to changes in environmental conditions such as vehicle flexing, pushing by passengers, vibration and thermal expansion. For example, the magnetic fastener clip may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip may be made of anti-corrosive material such as plastic or treated metal to provide long reliable service life.

Yet another advantage is that the magnetic fastener clip is relatively easy to manufacture using relatively inexpensive manufacturing processes and materials. The use of the magnetic fastener clip decreases production costs, increases worker productivity and efficiency, improves reliability and quality and decreases overall vehicle assembly, warranty and maintenance costs. The magnetic fastener clip securely attaches a body panel such as a door panel to a door frame, or headliner to the vehicle roof, such that the magnetic fastener clip improves reliability both in the short term and in the long term, while further improving vehicle safety and quality.

Figure 2:
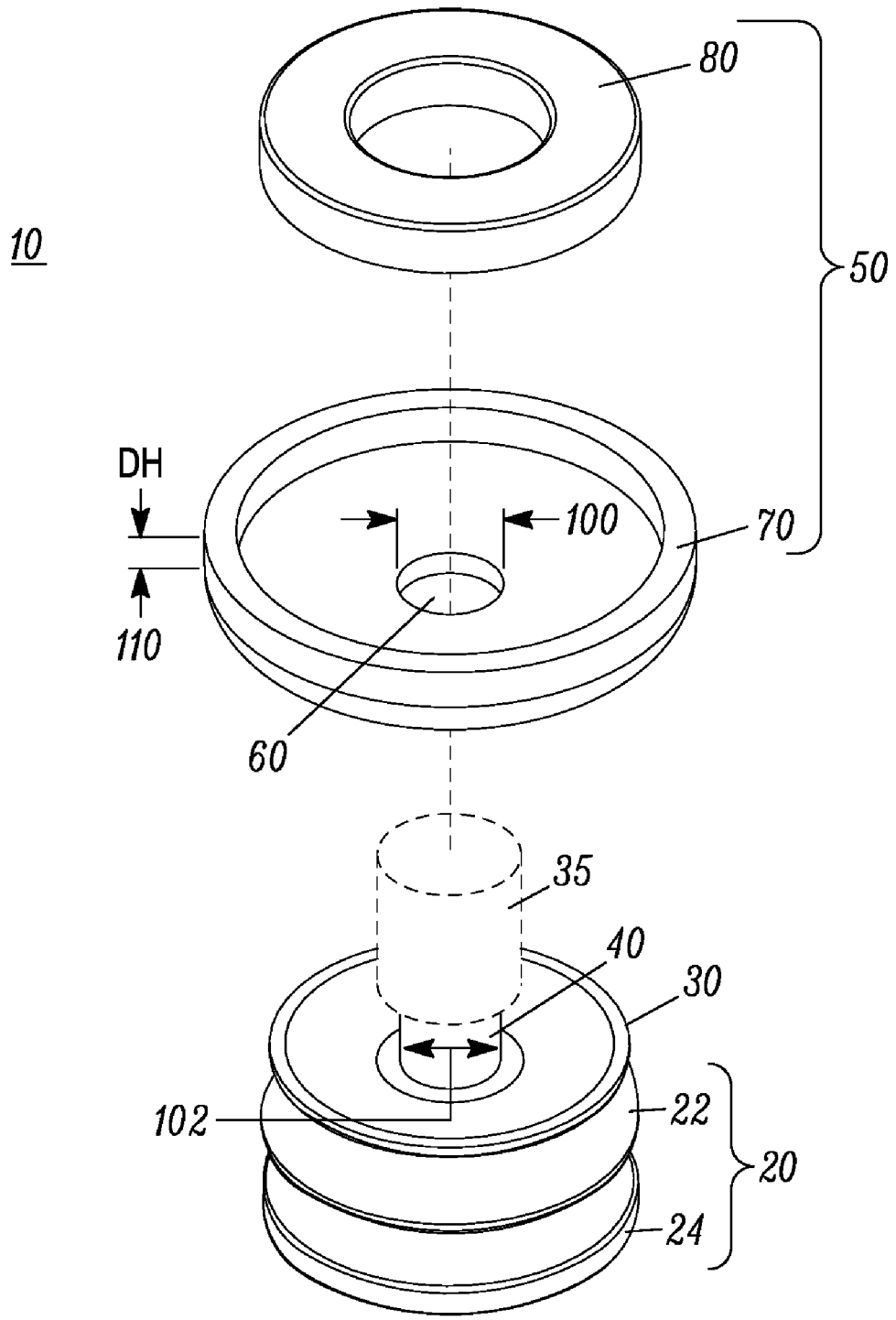
FIG. 2 is an exploded view of a magnetic fastener clip according to another embodiment.

FIGS. 1 and 2 are perspective views of a magnetic fastener clip 10 according to an embodiment. The magnetic fastener clip 10 includes a base 20, an umbrella 30 and a boss 40 attached to the base 20. According to one embodiment, one end of the boss 40 is attached to the base 20 and the other end has the two or more ratchets 245. Alternatively, either or both ends of the boss 40 may have the two or more ratchets 245. A magnetic fastener 50 has a hole 60 with suitable shape and diameter to adjustably fasten with at least one of the ratchets 245 and adjustably fasten the magnetic fastener 50. An umbrella 30 is positioned between the base 20 and the magnetic fastener 50.

As shown but not limited to FIG. 1 base 20 may be or may include a coupler suitable to engage a mounting structure (not shown) according to one embodiment. For example, base 20 may further include inner rib 22 and outer rib 24 connected by a post 300 shown in FIG. 3. Inner rib 22 outer rib 24 and post 300 may be sized to suitably engage a panel mounted tower with a side-slot in a body panel such as a headliner.

The ribs 22, 24 may be any suitable shape such as square, oval, round, rectangular. The ribs 22, 24 may have any suitable size and relative spacing between ribs 22, 24 via post 300. Alternatively, base 20 may include any attachment mechanism suitable to couple or attach to a body panel such as a nut, bolt, weld stud, thread stud, button head, clip, panel clip, retainer, panel mounted receptacle, retainer washer, or rivet, cable tie, wire clip, hook and loop fastener (Velcro®), sticky tape, double faced tape, spike array, or any suitable combination. The corresponding mounting structure thus would attach to the base attachment mechanism with a corresponding attachment mechanism such as a u-shaped compression flange to engage the post 300 and ribs 22, 24, a bolt-nut, or any suitable fastener pair.

The boss 40, 240, 840 has according to one embodiment, the two or more ratchets 245 on the boss 40, 240, 840. Several different types of boss 40, 240, 840 designs are shown however any suitable design is contemplated. According to exemplary embodiments contemplated in at least FIGS. 1 and 2, the two or more ratchets (not shown) extend on the boss 40, 240, 840 below umbrella 30 such that the base 20 engages the two or more ratchets. Although, FIGS. 3 through 16 show two or more ratchets 245 extend on the boss 40, 240, 840 above umbrella 30 to engage the magnetic fastener 50, the ratchets 245 may extend at either or even both ends of the boss 40, 240, 840. For example, ratchets 245 may engage both, the base 20 and the magnetic fastener 50 to provide a greater range of attachment distance.

According to one embodiment shown in FIG. 1 and FIG. 2, the umbrella 30 is positioned on base 20 itself, however depending on the gap between the body panel and the structure, the boss 40, 240, 840 or other component as described below may affect design criteria for dimensions of each component. For example, the magnetic fastener 50 may be mounted on the base 20 and thus no separate umbrella 30 is included, since the base may function as the umbrella. Depending on the space requirement between the roof and the headliner, the height of the magnetic fastener clip 10 may be increased with boss 40, 240, 840 of different heights and with more than 2, 3, 4, 5, 6, 7 or more ratchets 245. Alternatively, the height of the magnetic fastener clip 10 may be further sized by adjusting the height of the optional carrier 300 shown in FIG. 3. The boss 35, 40, 240 is attached to the umbrella 30 and may extend outwardly from the umbrella 30 and away from the base 20. According to one embodiment, the boss 40 may be fastened to the magnetic fastener 50 via any general suitable fastener 35 shown generically in FIG. 2 and for example as a weld in FIG. 1. According to one embodiment, the suitable fastener 35 may be the ratchets 245; however the suitable fastener may be a nut, pin, wedge, prong(s), spring, washer, hook(s), rib lock, clamp or any mechanism suitable to fasten magnetic fastener 50. Suitable fastener 35 may be made of plastic, metal or any suitable material or as described below. Although some examples of suitable fastener 35 are described and shown and further described below, including adjustable type fasteners, any suitable type of fastener may be employed. For example, in the embodiment shown in FIG. 1, the boss 40 is welded to the magnetic fastener 50 to form a weld 45 for fastening the magnetic fastener 50 to the boss 40. By way of example, the boss 40 attaches to the umbrella 30 as an injection molded piece or alternatively by: micro welding, ultrasonic welding (an ultrasonic horn melts the plastic boss in a pre-determine location to form a boss head), heat welding, spring finger, screw and pin or any suitable combination thereof.

According to one embodiment, the magnetic fastener 50 further comprises a holder 70 and a magnet 80. The magnetic fastener 50 may be a single piece (i.e. a magnet without a holder) or multi-piece device. Although the fastener clip 10 is shown in FIGS. 1-16 with a round magnetic fastener 50 any suitable shape may be used including oval, square, rectangular, triangular or polygon. The magnetic fastener 50 has a hole 60 with a magnetic fastener diameter 100 to receive the boss 40. The boss 40 has a thickness (diameter) 102. The magnetic fastener diameter 100 may be sized greater than boss diameter thickness 102 creating an optional gap between the boss 40 and the magnetic fastener hole 60 to allow the magnetic fastener 50 to tilt about the boss 40 such that the magnetic fastener 50 may conform to the contours of a surface such as a roof or body section. The hole 60 of the magnetic fastener 50 has a magnetic fastener height DH 110. The magnetic fastener height DH 110 may be sized also to allow the magnetic fastener 50 to tilt.

The boss 40 is attached to the magnetic fastener 10 such that, for example either the boss 40 and/or the umbrella 30 is operative to flex or compress to permit the umbrella 30 to pivot about the boss 40. According to one embodiment, the hole diameter 100, the magnetic fastener height 110, the boss diameter 102, and/or a boss height 42 are sized to allow the umbrella 30 to pivot about the boss 40 while remaining securely fastened to the boss 40. Any suitable combination of parameters may be sized to permit the desired amount of pivoting, flexing and or compression according for example to the curvature of an automobile body panel such as the roof. Similarly, the magnetic fastener thickness 110, the boss height 42 and/or a boss diameter 102, are sized to allow the umbrella 30 and/or the magnetic fastener 50 to pivot about the boss 40.

Figure 3:
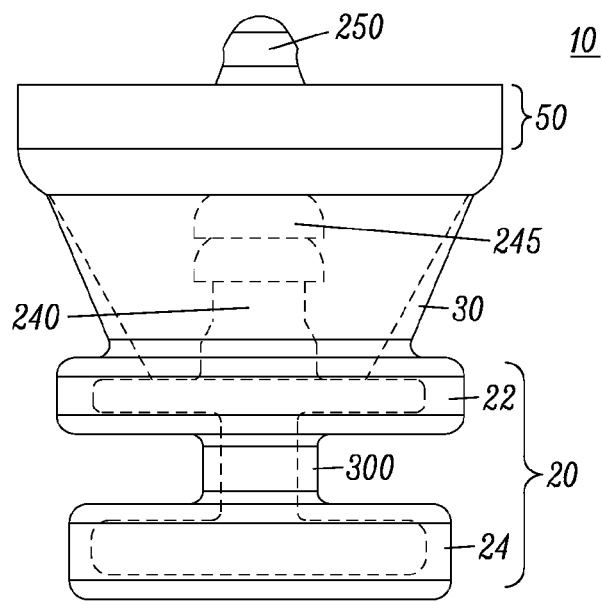
FIG. 3 is a side view of a portion of the magnetic fastener clip according to one embodiment.
Figure 4:
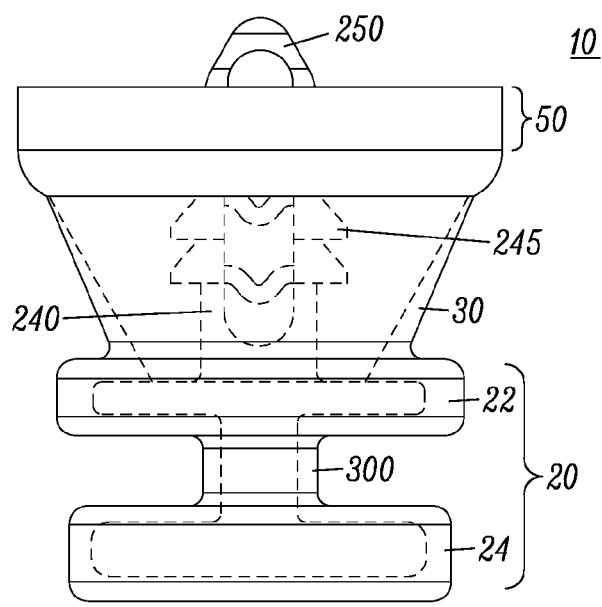
FIG. 4 is another side view of the magnetic fastener clip shown in FIG. 3 rotated 90 degrees.

FIGS. 3 and 4 are side views of the magnetic fastener clip 10 according to another embodiment however suitable fastener 35 adjusts via one or more ratchets 245. FIG. 4 is another side view of the magnetic fastener clip 10 shown in FIG. 3 rotated 90 degrees. According to this embodiment, the boss 240 further includes one or more ratchets 245. The one or more ratchets 245 permit the magnetic fastener 50 to attach at one or more ratchets 245 and ridges so that the distance between the magnetic fastener 50 and the base 20 may vary at least based on the position of the magnetic fastener 50 relative to the one or more ratchets 245. For example, boss 240 may have a tip 250 extending beyond the magnetic fastener 50 that may be inserted into a slot or hole of a body panel. Accordingly, the magnetic fastener clip 10 may replace one or more conventional fasteners that would be inserted into the hole or slot of the body panel. Instead of requiring different conventional fasteners for different size and height requirements, the magnetic fastener 50 may magnetically attach to a chassis or the metal ring surrounding the slot in the body panel and adjust to different size and height requirements.

The umbrella 30 shown is in spaced apart relation from the base 20, such that the umbrella 30 is positioned over and above the base 20 so as to define an open area. The height of the post 300, umbrella 30, base 20 or magnet holder 70, or any suitable combination thereof may be sized to provide the appropriate spacing between the body panel, such as a headliner and the chassis such as the roof.

The umbrella 30 may be of any suitable shape and length such that the umbrella 30 flexes as the magnetic fastener 50 pivots about the boss 40, 240, 840. According to one embodiment, the umbrella 30 substantially engages the magnetic fastener 50 at for example two or more points to provide support directly on the magnetic fastener 50. According to one embodiment, the umbrella 30 is made of rubber, plastic, metal or any material that is flexible enough to support the magnetic fastener 50 and allow the magnetic fastener 50 to flex.

FIG. 5 is a perspective view of the magnetic fastener clip 10. The magnetic fastener clip 10 may be pre-assembled by attaching the base 20, (22, and 24) of the magnetic fastener clip 10 to a body panel as described above, such as a headliner, to form a body panel assembly (not shown). Alternatively, the base 20 according to one embodiment may instead comprise base holes 500 shown in FIG. 5 of co-pending application Ser. No. 12/464,867 incorporated by reference. The base holes 500 permit attachment to the body panel by applying glue or any suitable fastener. Tapered holes that have a larger diameter on the top side of the base 20 (closest to the magnetic fastener 50) than on the bottom side (mating with the body panel) filled with glue will further provide a mechanical connection as well as the chemical connection as a result of the adhesive properties of the glue. The body panel assembly thus comprises a body panel attached to the magnetic fastener clip 10 attached via glue or other suitable fastener such as a screw, bolt, rivet or any suitable fastener to attach the body panel to the magnetic fastener clip 10.

The body panel assembly is operatively inserted as a single unit into a structure, such as a vehicle chassis, pillar, roof, instrument panel or frame to form a vehicle with the magnetic clip. The magnetic fastener clip 10 adapts to different chassis curvatures such that an angle between the magnetic fastener 50 and the base 20 is operative to vary continuously.

FIG. 6 is a top view of the magnetic fastener clip 10 shown in FIG. 5. According to one embodiment, the ratchets 245 may have any suitable shape, such as for example: tapered, straight, curved or any suitable shape. Thus the magnetic fastener is inserted into an appropriate ratchet position 245 or fastened in any suitable way at least as previously described.

FIG. 7 is a bottom view of the magnetic fastener clip according to one embodiment. As previously stated, base 20 may fasten to a body panel, frame or any suitable structure via a suitable fastener.

Figure 8:
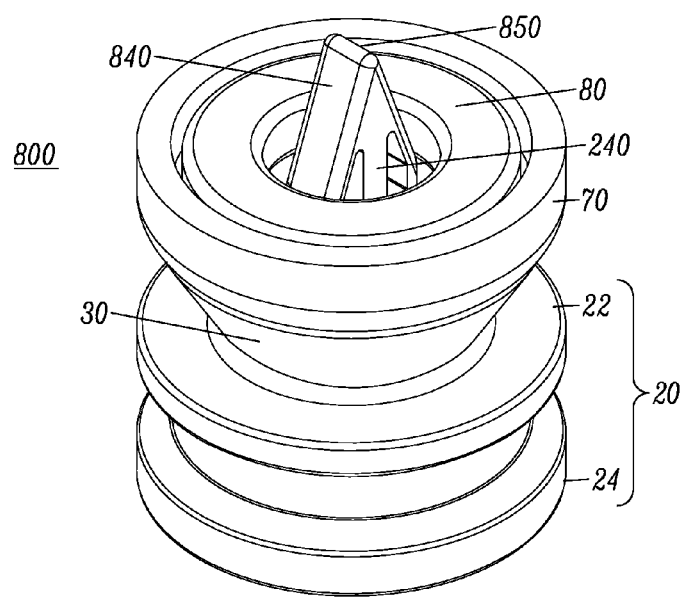
FIG. 8 is a perspective view of the magnetic fastener clip according to yet another alternative embodiment.
Figure 9:
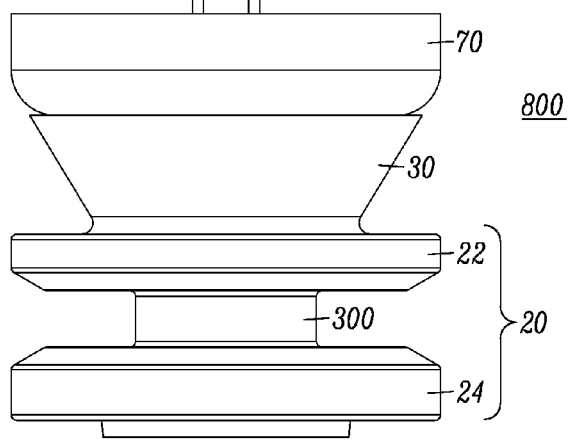
FIG. 9 is a side view the magnetic fastener clip according to the alternative embodiment.
Figure 10:
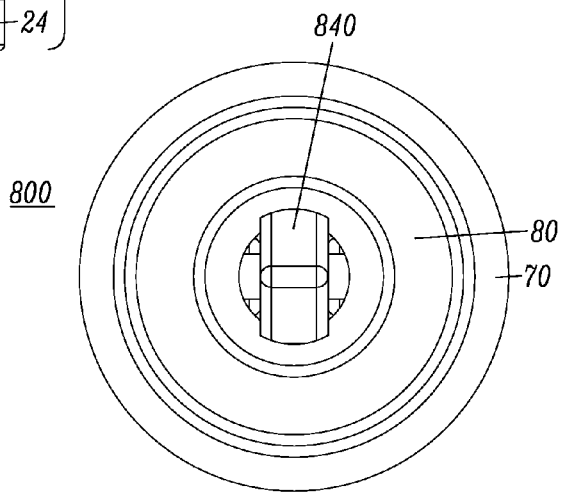
FIG. 10 is a top view of the magnetic fastener clip according to the alternative embodiment.

FIGS. 8, 9 and 10 are views of the magnetic fastener clip 800 according to yet another alternative embodiment. In this embodiment, the tip 850 of the boss is pointed or inclined 840. However, the tip 850 may be angled differently, curved, sloping, projecting or have any suitable shape.

Figure 11:
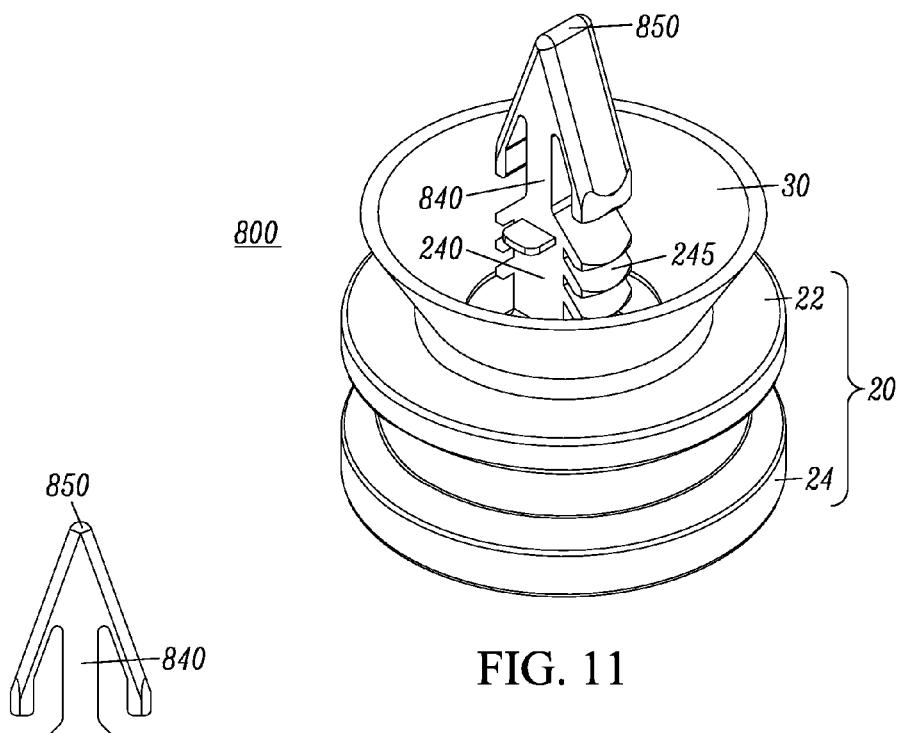
FIG. 11 is a perspective view of the magnetic fastener clip according to another embodiment.
Figure 12:
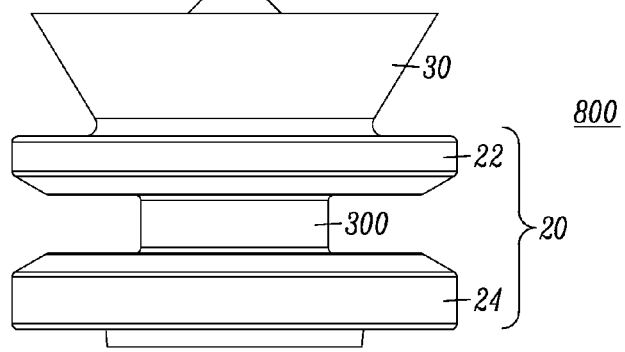
FIG. 12 is a side view the magnetic fastener clip according to the other embodiment.
Figure 13:
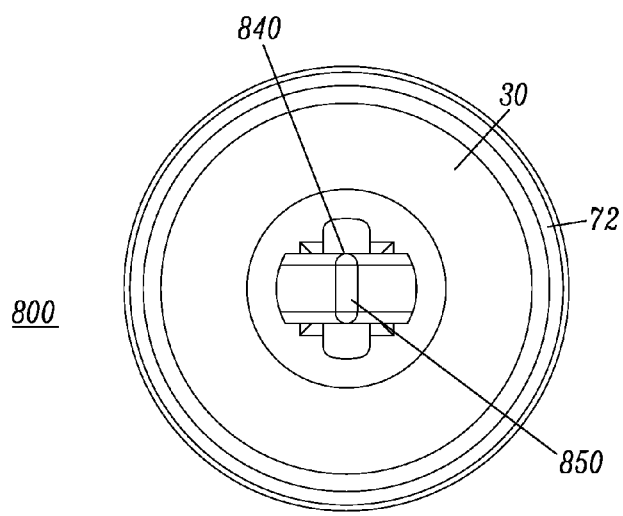
FIG. 13 is a top view of the magnetic fastener clip according to the alternative embodiment.

FIGS. 11, 12, and 13 further show the magnetic clip 800 of FIGS. 8, 9 and 10 without the magnetic fastener 50. For example, these figures illustrate the configuration of the magnetic clip 800 after molding or installing the umbrella 30, but before the magnetic fastener 50. The umbrella 30 may be a plastic component and may be injection molded with the base 20, boss 40, 240, 840. Alternatively, a rubber or other suitable material may be used for umbrella 30 and placed onto the base 20 and then readied for fastening.

FIGS. 14, 15, and 16 further show the magnetic clip 1400 of FIGS. 8, 9 and 10 without the umbrella 30 and rubber coating. According to one embodiment, the base 20, boss 40, 240, 840 are injection molded as a single plastic component, thought multiple components may be assembled in one or more injection steps. The angle or inclination, sharpness and length 1410 may vary depending on the diameter and shape of a slot in the vehicle chassis. Thus it is evident to one skilled in the art that the suitable fastener 35 is shown and described as yet another embodiment to illustrate that the structure for fastening the magnetic fastener is not limited to the examples provided.

According to one embodiment, the fastener clip 10 is made in whole or in part of: plastic as described below, magnetic steel or any suitable metal. The clip 10 and body panel may be constructed from plastic or from any suitable material such as plastic, vinyl, cloth, wood, steel, aluminum, magnesium, carbon fiber or any suitable material.

The umbrella 30, boss 40, 240, 740 carrier 300, holder 70 and base 20, or any combination of components may be made from: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene (ABS), or any suitable material and combination thereof.

According to one embodiment, the umbrella 30, boss 40, 240, 740 and base 20 are made from Polypropylene as described in co-pending application Ser. No. 12/464,867 incorporated by reference. Polypropylene or polypropene is normally tough and flexible, especially when copolymerised with ethylene. This allows polypropylene to be used as an engineering plastic, and thus may be used in place of other materials such as ABS, acrylic or certain other plastics. Polypropylene is reasonably economical, and has good resistance to fatigue. Polypropylene has a melting point of ~160° C. (320° F.), as determined by Differential scanning calorimetry (DSC) and thus is suitable for injection molding. Melt processing of polypropylene can be achieved via extrusion and molding. Injection molding may be used to obtain the desired shape.

As shown in some embodiments, the umbrella 30 may be flush with the base 20. According to this embodiment, there is relatively little or no open area between the base 20 and the umbrella 30. This may be suitable for short height applications where there is little or a relatively short distance between the chassis and body panel, i.e. headliner and roof. Thus a body panel assembly may include magnetic fasteners of various heights. For example the magnetic fasteners of various heights may be used where the distance between the headliner and roof varies.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A magnetic fastener clip comprising:
a base;
a boss having two or more ratchets, the boss being attached to the base;
a magnetic fastener having a hole with a diameter to adjustably fasten with the boss at one of the ratchets; and
an umbrella positioned between the base and the magnetic fastener, operative to spin, compress, or flex about the boss.

2. The magnetic fastener clip of claim 1 wherein at least one of the ratchets has one or more ridges operable to engage the magnetic fastener at a coupling distance between the base and the magnetic fastener.

3. The magnetic fastener clip of claim 1 wherein at least one of: an umbrella stiffness, flexibility, compressibility, rotatability, an umbrella size, a hole diameter, a boss diameter, a magnetic fastener thickness and a boss height allow the magnetic fastener to pivot about the boss.

4. The magnetic fastener clip of claim 1 wherein the boss has at least one of: a rounded tip, a pointed tip, and a barb.

5. The magnetic fastener clip of claim 1 wherein at least one of: the umbrella, boss and base are comprised of at least one of: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene (ABS).

6. The magnetic fastener clip of claim 1 wherein as the umbrella flexes, the magnetic fastener may pivot about the boss for example at an angle to allow the magnetic fastener to adapt to different surface curvatures.

7. The magnetic fastener clip of claim 1 wherein the magnetic fastener further comprises a holder and a magnet.

8. A magnetic fastener clip comprising:
a base;
a coupler attached to the base;
a boss having two or more ratchets, the boss being attached to the base;
a magnetic fastener having a hole with a diameter to adjustably fasten with the boss at one of the ratchets; and
an umbrella positioned between the base and the magnetic fastener such that the umbrella is operative to flex and permit the magnetic fastener to engage at least one of the two or more ratchets.

9. The magnetic fastener clip of claim 8 wherein at least one of the ratchets has one or more ridges operable to engage the magnetic fastener.

10. The magnetic fastener clip of claim 8 wherein at least one of: an umbrella stiffness, flexibility, compressibility, rotatability, an umbrella size, a hole diameter, a boss diameter, a magnetic fastener thickness and a boss height allow the magnetic fastener to pivot about the boss.

11. The magnetic fastener clip of claim 8 wherein the umbrella pivots, flexes or compresses about the boss according to a curvature of an automobile body panel.

12. The magnetic fastener clip of claim 8 wherein the coupler further comprises at least one rib.

13. The magnetic fastener clip of claim 8 wherein the umbrella is flush with the base.

14. The magnetic fastener clip of claim 8 wherein the boss attaches the magnetic fastener to the umbrella by at least one of: micro welding, ultrasonic welding, heat welding, spring finger, screw and pin.

15. The magnetic fastener clip of claim 8 wherein at least one of: the umbrella, boss and base are comprised of at least one of: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene (ABS).

16. The magnetic fastener clip of claim 8 wherein the umbrella spins about the boss.

17. The magnetic fastener clip of claim 8 wherein the magnetic fastener further comprises a holder and magnet.

18. A vehicle and magnetic clip comprising:
a vehicle chassis having a body panel;
a magnetic fastener clip comprising:
a base;
a coupler attached to the base, the coupler engaging the body panel;
a boss having two or more ratchets, the boss being attached to the base;
a magnetic fastener having a hole with a diameter to adjustably fasten with the boss at one of the ratchets; and
an umbrella positioned between the base and the magnetic fastener such that the umbrella is operative to flex and permit the magnetic fastener to engage at least one of the two or more ratchets.

19. The vehicle and magnetic clip of claim 18 wherein at least one of the ratchets has one or more ridges operable to engage the magnetic fastener at a coupling distance between the coupler and the magnetic fastener.

20. The vehicle and magnetic clip of claim 18 wherein a magnetic fastener thickness and a boss thickness, are sized to allow the magnetic fastener to pivot about the boss.

21. The vehicle and magnetic clip of claim 18 wherein the umbrella pivots, spins, compresses, or flexes about the boss according to a curvature of an automobile body panel.

* * * * *